United States Patent
Fugel et al.

(10) Patent No.: US 10,077,832 B2
(45) Date of Patent: Sep. 18, 2018

(54) PLANET GEAR BEARING IN A PLANETARY GEARSET

(71) Applicant: Schaeffler Technologies AG & Co. KG, Herzogenaurach (DE)

(72) Inventors: Wolfgang Fugel, Nuremberg (DE); Martin Gegner, Langenfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 472 days.

(21) Appl. No.: 14/764,368

(22) PCT Filed: Dec. 10, 2013

(86) PCT No.: PCT/DE2013/200341
§ 371 (c)(1),
(2) Date: Jul. 29, 2015

(87) PCT Pub. No.: WO2014/121769
PCT Pub. Date: Aug. 14, 2014

(65) Prior Publication Data
US 2015/0377343 A1 Dec. 31, 2015

(30) Foreign Application Priority Data

Feb. 8, 2013 (DE) .................. 10 2013 202 070
Apr. 29, 2013 (DE) .................. 10 2013 207 780

(51) Int. Cl.
*F16H 57/08* (2006.01)
*F16H 57/04* (2010.01)
(Continued)

(52) U.S. Cl.
CPC .......... *F16H 57/082* (2013.01); *F16C 19/30* (2013.01); *F16C 19/305* (2013.01);
(Continued)

(58) Field of Classification Search
CPC ............ F16H 2057/085; F16H 57/082; F16H 57/0479; F16C 2361/61
See application file for complete search history.

(56) References Cited

U.S. PATENT DOCUMENTS 5,368,528 A * 11/1994 Farrell .................... F16C 19/48
384/424
5,795,258 A   8/1998 Faass et al.
(Continued)

FOREIGN PATENT DOCUMENTS

CN    201461870    5/2010
CN    202182159    4/2012
(Continued)

*Primary Examiner* — Erin D Bishop
(74) *Attorney, Agent, or Firm* — Volpe and Koenig, P.C.

(57) ABSTRACT

A planet gear bearing in a planetary gearset including a planet carrier having two side walls which are arranged parallel to one another and accommodate a plurality of planet gear pins in a plurality of axial holes opposite one another on the same axis is disclosed. A plurality of planet gears are rotatably mounted on the planet gear pins by radial rolling-element bearings inserted into central planet gear holes. Stop elements are arranged between the side walls of the planet carrier and the axial sides of the planet gears and act as wear protection of the planet carrier and the planet gears, and as an axial stop for the radial rolling-element bearings of the planet gears. The stop elements are axial needle bearings, which each include an axial bent-up disc and an axial needle ring formed by a plurality of bearing needles and an axial needle cage.

8 Claims, 6 Drawing Sheets

(51) Int. Cl.
*F16C 19/30* (2006.01)
*F16C 19/38* (2006.01)
*F16C 33/58* (2006.01)
*F16C 33/66* (2006.01)
*F16C 33/60* (2006.01)
*F16C 19/28* (2006.01)

(52) U.S. Cl.
CPC .......... *F16C 19/381* (2013.01); *F16C 33/581* (2013.01); *F16C 33/588* (2013.01); *F16H 57/0479* (2013.01); *F16C 19/28* (2013.01); *F16C 33/60* (2013.01); *F16C 33/6677* (2013.01); *F16C 33/6685* (2013.01); *F16C 2361/61* (2013.01); *F16H 2057/085* (2013.01)

(56) References Cited

U.S. PATENT DOCUMENTS

| | | |
|---|---|---|
| 5,879,261 A | 3/1999 | Bayer |
| 7,377,870 B2 * | 5/2008 | Matsushita ......... F16H 57/0482 475/159 |
| 7,384,360 B2 | 6/2008 | Ploetz et al. |
| 8,591,371 B2 | 11/2013 | Dinter et al. |
| 2012/0322606 A1 | 12/2012 | Lewis et al. |
| 2013/0136387 A1 | 5/2013 | Fugel et al. |
| 2013/0223786 A1 | 8/2013 | Fugel et al. |

FOREIGN PATENT DOCUMENTS

| | | |
|---|---|---|
| DE | 4418693 | 3/1995 |
| DE | 19612144 | 11/1996 |
| DE | 19804734 | 8/1998 |
| DE | 10334880 | 3/2005 |
| DE | 102010033122 | 2/2012 |
| DE | 102010048479 | 4/2012 |
| JP | 2005249053 | 9/2005 |

* cited by examiner

PLANET GEAR BEARING IN A PLANETARY GEARSET

FIELD OF THE INVENTION

The invention relates to a planet gear bearing in a planetary gearset and can be realized, in an especially advantageous way, in planetary gearsets arranged in a passenger car automatic transmission.

BACKGROUND

The most common embodiment of passenger car automatic transmissions is the so-called torque converter transmission that differs from conventional and automated shifting transmissions primarily by a non-tractive-force-interrupting shifting process. Such passenger car automatic transmissions usually have a hydraulic torque converter startup clutch and are assembled essentially from several plate clutches and a combination of several free-running gears and planetary gearsets. All shifting and coupling processes are here performed via the plate clutches that produce the non-positive-fit connection of the planetary gearsets connected one after the other to the input and output shaft of the automatic transmission. The individual planetary gearsets are assembled in a known way from the coaxial components, sun gear, planet carrier, and ring gear, as well as the planet gears that can rotate in the planet carrier at a constant axle distance. The drive takes place by means of the sun gear while the rotational movement is transmitted via the planet gears to the planet carrier (driven shaft) and the rolling of the planet gears in the ring gear produces a corresponding transmission ratio.

The support of the planet gears in such planetary gearsets is known, for example, from DE 44 18 693 C1, DE 198 04 734 A1, or DE 103 34 880 A1 and is formed essentially from two side walls that form the planet gear carrier and are arranged parallel to each other and hold a plurality of planet gear pins in multiple coaxial opposing axial holes. The planet gears are supported on these planet gear pins so that they can rotate by means of radial rolling bearings that are inserted into central planet gear holes and are usually formed as needle rings or as solid roll needle sets and are permanently lubricated by means of axial and radial lubricant feed lines within the planet gear pins. In addition, between the side walls of the planet gear carrier and the axial sides of each planet gear there are two circular ring-shaped contact discs that are formed as wear protection of the usually unhardened planet gear carrier and the planet gears, as well as the axial contact for the radial rolling bearings of the planet gears. So that these contact discs cause no lubricant blockage in the radial rolling bearings of the planet gears, which could lead to an undesired temperature increase of the lubricant and the radial rolling bearing due to the through-tumbling of the blocked lubricant quantity, it is known through the specified publications to discharge the lubricant either via recesses formed at the inner diameter of the contact discs or through chord-like grooves in the plant gear pins through the contact discs.

A disadvantage in such a plant gear bearing, however, is that contact discs between the planet gears and the planet carrier produce high power losses due to the sliding friction occurring between the carrier and the planet gears, so that such planetary gearsets cannot satisfy the high energy efficiency required in modern passenger car automatic transmissions. Likewise, the known measures for contact discs for improving the lubricant flow through the radial rolling bearings have proven inadequate, because the lubricant flow guided through the recesses in the contact discs is stopped by the side walls of the planet carrier on the back side of the contact discs and thus results as before in the undesired lubricant blockage in the radial rolling bearings of the planet gears. In addition, the known planet gear bearing has also proven disadvantageous in terms of complicated production and installation of the planet gears, because special surface treatment through grinding and honing is required for the axial sides of the planet gears for reducing the sliding friction with the contact discs. The installation of the planet gears in the planet carrier is then realized in a cumbersome way such that first the planet gear pin must be pushed through the axial hole of one side wall of the planet carrier and then the first contact disc is pushed onto the planet gear pin, then the planet gear is inserted with the preassembled radial rolling bearing between the side walls of the planet gear carrier and the planet gear pin must be pushed through the planet gear, in order to finally insert the second contact disc between the planet gear and the other side wall of the planet gear carrier and to push the planet gear pin into the axial hole of the other side wall.

SUMMARY

Starting with the described disadvantages of the known prior art, the invention is based on the object of designing a planet gear bearing in a planetary gearset with which the output losses produced by sliding friction on the planet gears can be prevented and sufficient lubricant flow through the radial rolling bearings can be realized and which enables a more economical production of the planet gears, as well as simplified installation of the planet gears in the planetary gearset.

This objective is achieved according to the invention for a planet gear bearing such that the contact elements between the side walls of the planet gear carrier and the axial sides of the planet gears are each constructed as axial needle bearings including an axial bent-up disc and an axial needle ring formed by a plurality of bearing needles and an axial needle cage.

Preferred constructions and advantageous refinements of the planet gear bearing formed according to the invention are described below and in the claims.

According to the planet gear bearing formed according to the invention, it is provided that each axial needle bearing has an axial width of at least 0.8 mm formed from the diameter of the bearing needles and the material thickness of the axial bent-up disc and can replace contact discs previously used in the same position with an axial width of 0.8 mm or larger without changing the surrounding constructions. Because the contact discs most commonly used for planet gear bearings in passenger car automatic transmissions have a minimum axial width of 0.8 mm, it is thus possible to replace almost all contact discs in the planetary gearsets of an automatic transmission for low-friction axial needle bearings. This was previously not considered at all, because previously all attempts to produce axial needle bearings with such a small axial width have proven extremely problematic with respect to the machine production and installation processes due to the filigree design of the axial needle ring and the axial bent-up disc.

According to other aspects of the planet gear bearing formed according to the invention is also distinguished in that the axial bent-up discs of the axial needle bearing have an S-shaped profile cross section that consists radially from an outer horizontal leg, an upper vertical leg, a middle horizontal leg, a lower vertical leg, and an inner horizontal leg. The outer horizontal legs, the upper vertical legs, and the middle horizontal legs of the axial bent-up discs are here provided for holding the axial needle ring, wherein the inner sides of the upper vertical legs form the raceways for the bearing needles. In contrast, the outer sides of the upper vertical legs of the axial bent-up discs contact the side walls of the planet gear carrier and the inner sides of the lower vertical legs of the axial bent-up discs are formed as axial contact for the radial rolling bearings of the planet gears.

According to another feature of the planet gear bearing formed according to the invention is that the radial rolling bearings for each planet gear are preferably formed as two radial needle rings that are arranged one after the other and include a cage and a plurality of bearing needles and are in contact with their cages with the lower vertical legs of the axial bent-up discs. The bearing of planet gears on two or even more needle rings has proven advantageous with respect to restrictions of the bearing needles especially for relatively wide planet gears. For narrow planet gears, however, it is also possible to form the radial rolling bearings as individual needle rings or as single-row, solid roll needle sets.

A first advantageous embodiment of the planet gear bearing formed according to the invention provides that the outer diameter of the middle horizontal legs of the axial bent-up discs is greater than the diameter of the planet gear holes. It has proven favorable to construct the outer diameter of the middle horizontal legs greater than the diameter of the planet gear holes by approximately the diameter of the bearing needles of the radial needle ring. This construction has the background that the lower vertical legs of the axial bent-up discs must be formed extended in the radial direction, so that, advantageously, two gap seals are formed between the lower vertical legs of the axial bent-up discs and the axial sides of the planet gears with which the lubricant outflow from the radial rolling bearings of the planet gears can be throttled, if this is required for a certain planet gear bearing in a planetary gearset.

In a second advantageous embodiment of the planet gear bearing formed according to the invention, it is provided that the outer diameter of the middle horizontal legs of the axial bent-up discs is less than the diameter of the planet gear holes. Similar to the first embodiment, it has proven especially useful for the outer diameter of the middle horizontal leg to be formed smaller than the diameter of the planet gear holes by the diameter of the bearing needles of the radial needle rings. Such a construction also has the background that the lower vertical legs of the axial bent-up discs are formed with a radially shortened construction so that between the middle horizontal legs of the axial bent-up discs and the planet gear holes, two larger ring gaps are formed with which a large volume flow of lubricant can be discharged from the radial rolling bearings of the planet gears, if this is required for a certain planet gear bearing in a planetary gearset.

Finally, it is also proposed as the third advantageous embodiment of the planet gear bearing formed according to the invention that the outer diameter of the middle horizontal leg of the axial bent-up discs is also smaller than the diameter of the planetary gear holes and simultaneously the middle horizontal legs and inner horizontal legs are formed axially extended. In this way, it has proven preferable to form the outer diameter of the middle horizontal leg smaller than the diameter of the planet gear holes only by approximately half the diameter of the bearing needles of the radial needle rings and to form the middle and inner horizontal legs axially approximately twice as long as the outer horizontal legs. Through such a formation, the middle and inner horizontal legs and the lower vertical legs of the axial bent-up discs project into the planet gear holes such that the planet gears, together with the axial needle bearings and radial rolling bearings, form a module that can be assembled significantly more easily than before through simple insertion into the planet gear carrier and non-interrupted pushing of the planet gear pin. Simultaneously, such a formation also produces, between the middle horizontal legs of the axial bent-up discs and the planet gear holes, two gap seals with which a throttled lubricant outflow from the radial rolling bearings of the planet gears is possible.

In summary, the planet gear bearing formed according to the invention has the advantage relative to the planet gear bearings known from the prior art that instead of the contact discs previously used between the side walls of the planet gear carrier and the axial sides of the planet gears, now axial needle bearings are used that have the same axial width as the contact discs and thus can replace these without changes to the surrounding constructions. In this way, the planet gears are now supported via rolling elements axially against the planet gear carrier, so that the power losses previously produced by sliding friction on the planet gears can be almost completely prevented. Simultaneously, for all embodiments of the planet gear bearing according to the invention, sufficient lubricant flow through the radial rolling bearing can be realized, because through a targeted profiling of the axial bent-up discs of the axial needle bearing, the lubricant can be discharged through corresponding ring gaps between the planet gears and the axial bent-up discs, as well as via the axial needle ring made from the radial rolling bearings of the planet gears. In addition, through the planet gear bearing according to the invention, a more economical production of the planet gears and also simplified installation of the planet gears in the planet carrier is possible, because for the axial sides of the planet gears, only a less fine surface treatment through grinding is necessary and its installation can be performed through simple insertion into the planet gear carrier and non-interrupted pushing of the planet gear pin.

BRIEF DESCRIPTION OF THE DRAWINGS

The planet gear bearing formed according to the invention is described in more detail below in three preferred embodiments with reference to the accompanying drawings. Shown are.

DETAILED DESCRIPTION OF THE PREFERRED EMBODIMENTS

Figure 1:
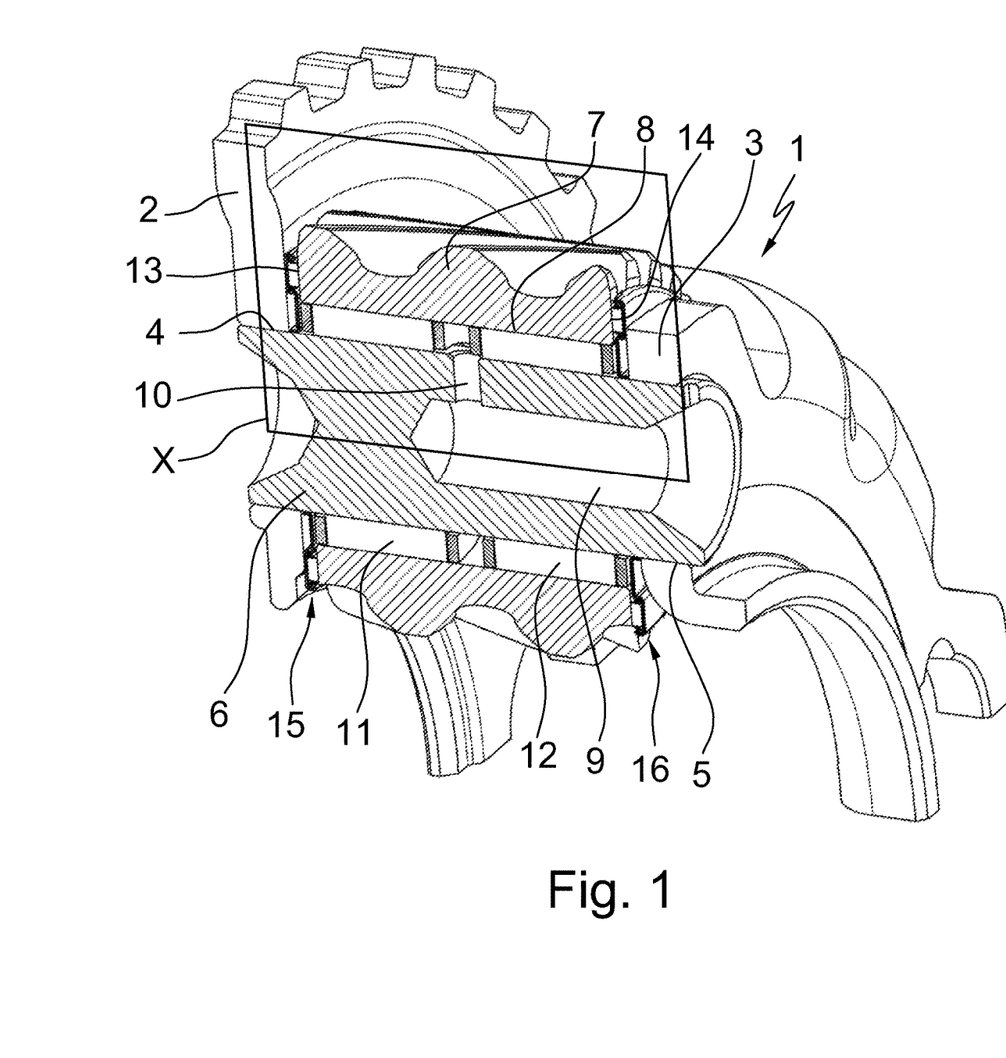
FIG. 1 a three-dimensional partial view of a cross section through a planetary gearset with a first embodiment of the planet gear bearing formed according to the invention, FIG. 2 an enlarged view of the detail X of the planet gear bearing formed according to the invention as per FIG. 1, FIG. 3 a three dimensional partial view of a cross section through a planetary gearset with a second embodiment of the planet gear bearing formed according to the invention, FIG. 4 an enlarged view of the detail Y of the planet gear bearing formed according to the invention as per FIG. 3, FIG. 5 a three-dimensional partial view of a cross section through a planetary gearset with a third embodiment of the planet gear bearing formed according to the invention, FIG. 6 an enlarged view of the detail Z of the planet gear bearing formed according to the invention as per FIG. 5.
Figure 3:
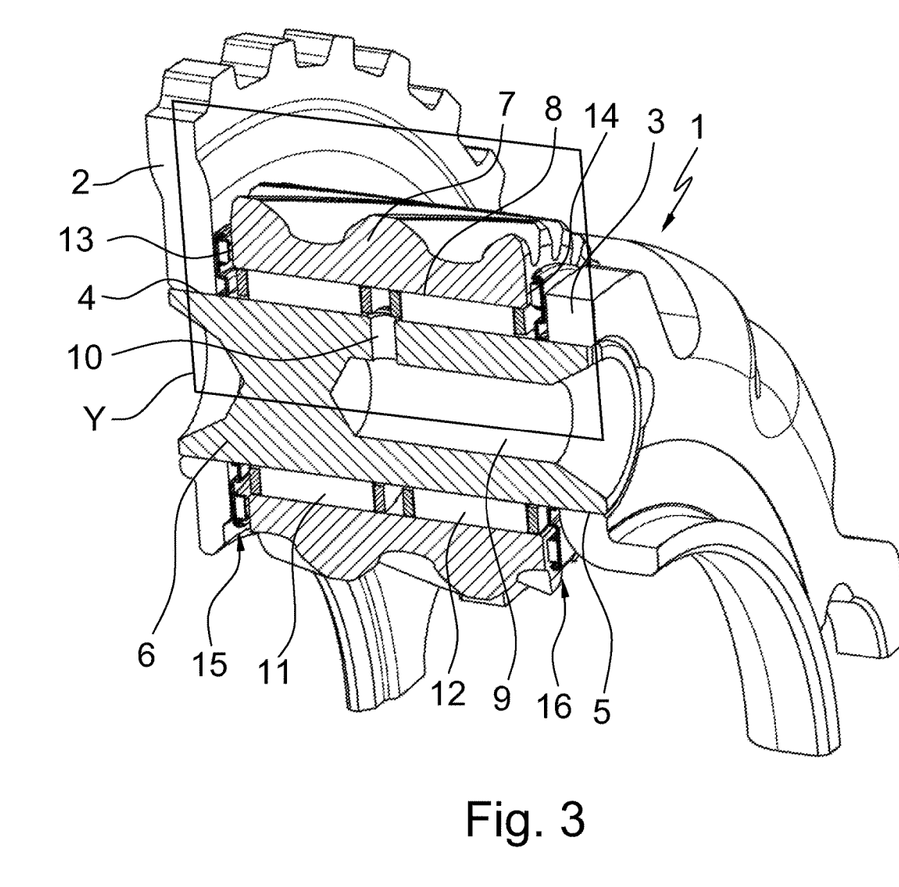
Figure 5:
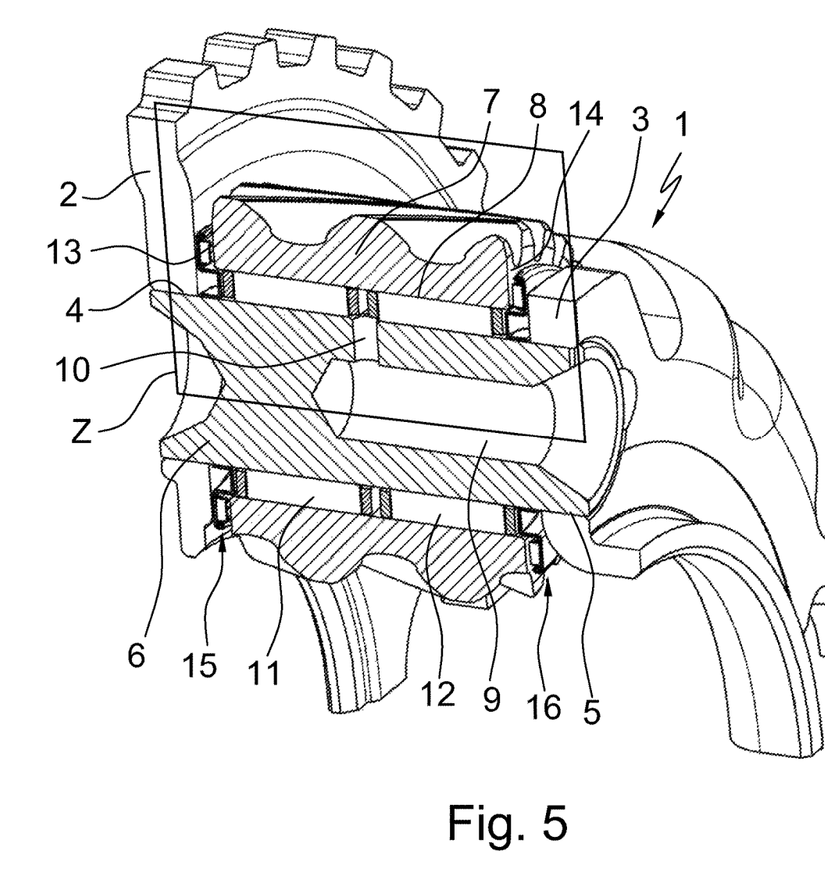

FIGS. 1, 3, and 5 each clearly show a planet gear bearing in a planetary gearset that essentially consists of a planet gear carrier 1 with two side walls 2, 3 that are arranged parallel to each other and hold a plurality of planet gear pins 6 in several coaxial opposing axial holes 4, 5. On the planet gear pins 6, several planet gears 7 are supported so that they can rotate by means of radial rolling bearings 11, 12 inserted into central planet gear holes 8 and are permanently lubricated via axial and radial lubricant feed lines 9, 10 within the planet gear pin 6. In addition, between the side walls 2, 3 of the planet gear carrier 1 and the axial sides 13, 14 of the planet gears 7, ring disc-shaped contacts 15, 16 are arranged that are formed as wear protection of the planet gear carrier 1 and the planet gears 7 and as axial contact for the radial rolling bearings 11, 12 of the planet gears 7.

Figure 2:
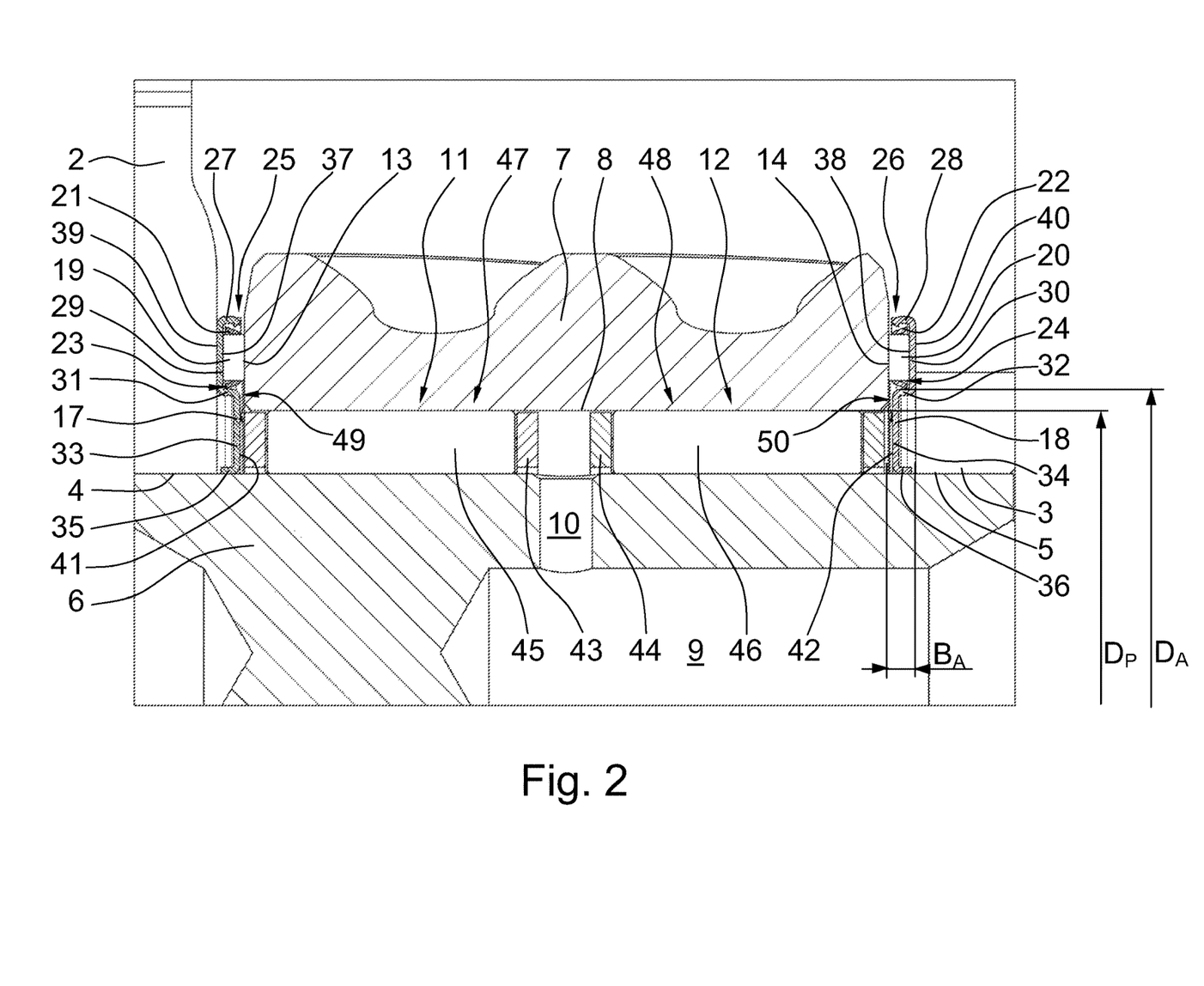
Figure 4:
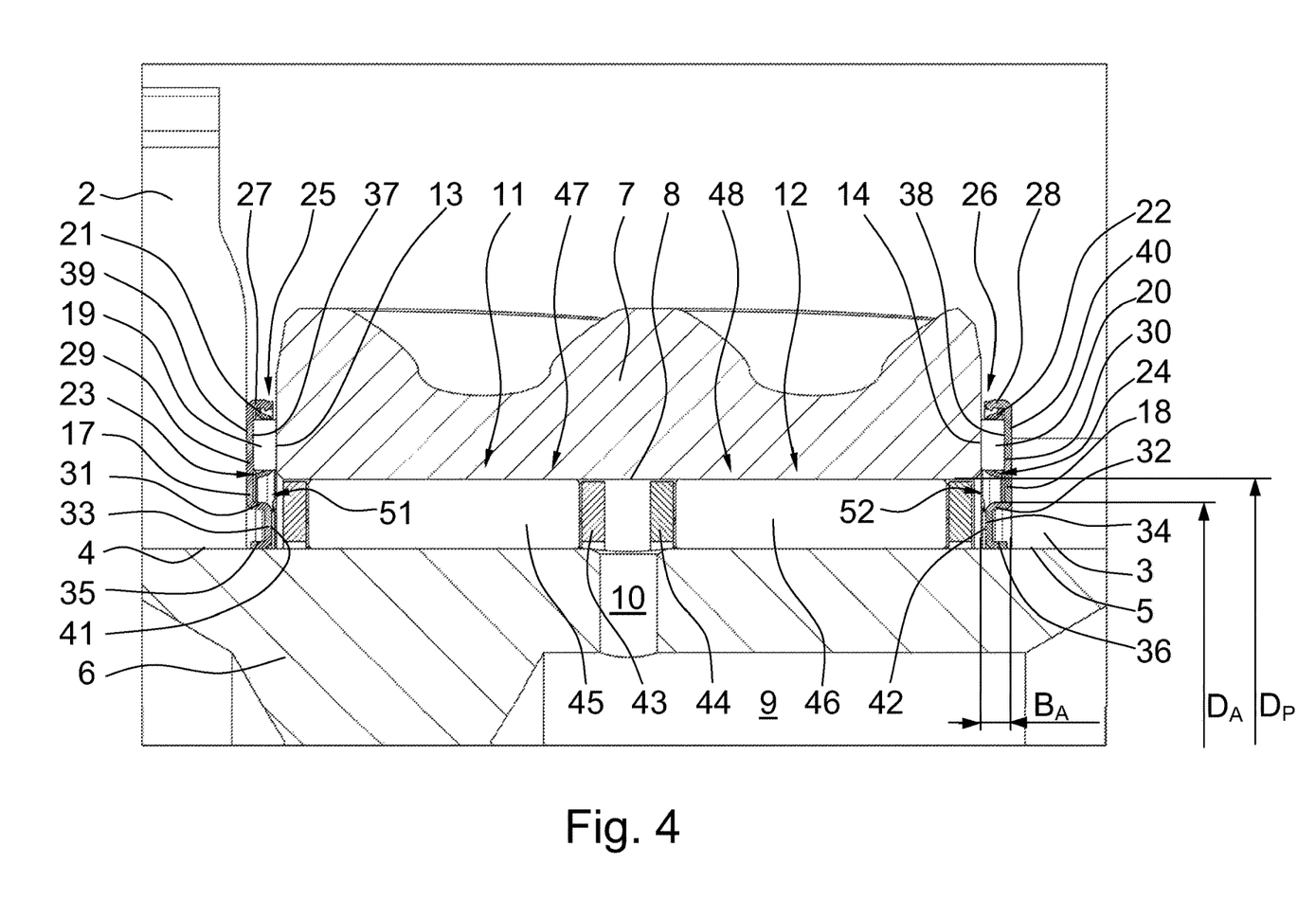
Figure 6:
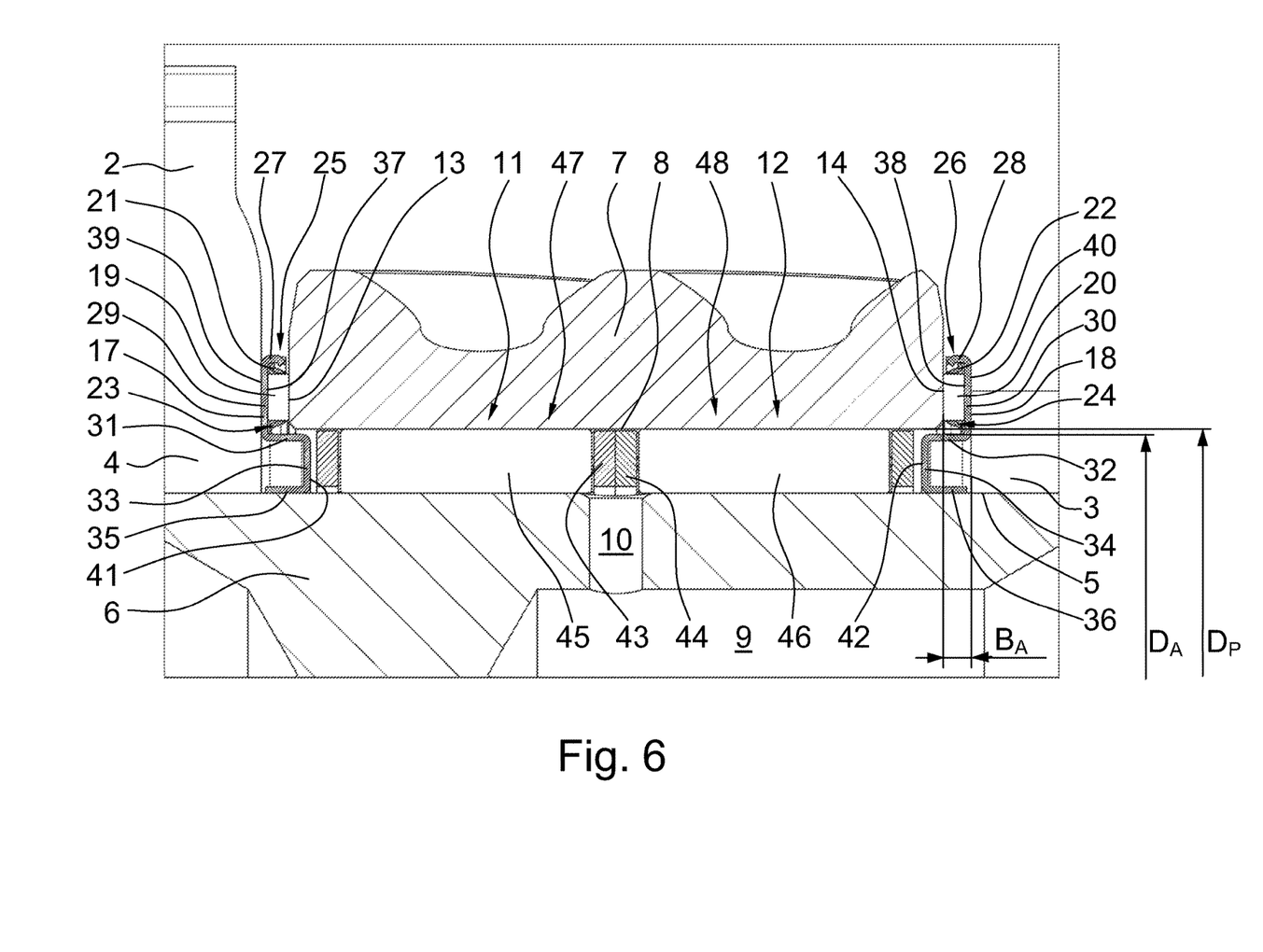

From FIGS. 2, 4, and 6, it also emerges that the ring disc-shaped contact elements 15, 16 between the side walls 2, 3 of the planet gear carrier 1 and the axial sides 13, 14 of the planet gears 7 are each formed according to the invention as axial needle bearings 25, 26 that include an axial bent-up disc 17, 18 and an axial needle ring 23, 24 formed by a plurality of bearing needles 19, 20 and an axial needle cage 21, 22 and have an axial width $B_A$ of at least 0.8 mm formed from the diameter of the bearing needles 19, 20 and the material thickness of the axial bent-up disc 17, 18 and therefore can replace any contact disc previously used at the same position with an axial width of 0.8 mm or greater without changes to the surrounding constructions.

In addition, from FIGS. 2, 4, and 6 it can be seen that the axial bent-up discs 17, 18 of the axial needle bearings 25, 26 have an S-shaped profile cross section that consists radially from an outer horizontal leg 27, 28, an upper vertical leg 29, 30, a middle horizontal leg 31, 32, a lower vertical leg 33, 34, and an inner horizontal leg 35, 36. The outer horizontal legs 27, 28, the upper vertical legs 29, 30, and the middle horizontal legs 31, 32 of the axial bent-up discs 17, 18 are here provided for holding the axial needle rings 23, 24, while the inner sides 37, 38 of the upper vertical legs 29, 30 simultaneously form the raceways for the bearing needles 19, 20 and the outer sides 39, 40 of the upper vertical legs 29, 30 contact the side walls 2, 3 of the planet gear carrier 1. The inner sides 41, 42 of the lower vertical leg 33, 34 of the axial bent-up discs 17, 18 are, in contrast, formed as axial contact for the radial rolling bearings 11, 12 of the planet gears 7, wherein the radial rolling bearings 11, 12 are formed as two radial needle rings 47, 48 that are arranged one next to the other and each include a cage 43, 44 and a plurality of bearing needles 45, 46 and are in contact with their cages 43, 44 with the lower vertical legs 33, 34 of the axial bent-up discs 17, 18.

The special feature of the first embodiment shown in FIGS. 1 and 2 for the planet gear bearing according to the invention is that the outer diameter $D_A$ of the middle horizontal leg 31, 32 of the axial bent-up discs 17, 18 is greater than the diameter $D_P$ of the planet gear holes (8) by the diameter of the bearing needles 45, 46 of the radial needle rings 47, 48, so that the lower vertical legs 33, 34 of the axial bent-up discs 17, 18 are formed radially extended and form, between the lower vertical legs 33, 34 and the axial sides 13, 14 of the planet gears 7, two gap seals 49, 50 with which the lubricant outflow from the radial rolling bearings 11, 12 of the planet gears 7 can be throttled.

The second embodiment shown in FIGS. 3 and 4 for the planet gear bearing according to the invention differs from the first embodiment in that the outer diameter $D_A$ of the middle horizontal leg 31, 32 of the axial bent-up discs 17, 18 is here smaller than the diameter $D_P$ of the planet gear holes 8 by the diameter of the bearing needles 45, 46 of the radial needle rings 47, 48. Therefore, the lower vertical legs 33, 34 of the axial bent-up discs 17, 18 are radially shortened so that, between the middle horizontal legs 31, 32 of the axial bent-up discs 17, 18 and the planet gear holes 8, two larger ring gaps 51, 52 are formed with which a large volume flow of lubricant can be discharged from the radial rolling bearings 11, 12 of the planet gears 7.

The third embodiment shown in FIGS. 5 and 6 for the planet gear bearing according to the invention is finally distinguished in that the outer diameter $D_A$ of the middle horizontal legs 31, 32 of the axial bent-up discs 17, 18 is smaller than the diameter $D_P$ of the planet gear holes 8 only by approximately half the diameter of the bearing needles 45, 46 of the radial needle rings 47, 48 and simultaneously the middle horizontal legs 31, 32 of the inner horizontal legs 35, 36 are axially approximately twice as long as the outer horizontal legs 27, 28. Therefore, the middle and inner horizontal legs 31, 32, 35, 36 and the lower horizontal legs 33, 34 project into the planet gear holes 8 such that the planet gears 7 form, together with the axial needle bearings 25, 26 and radial rolling bearings 11, 12, a module that can be installed significantly more easily than before through simple insertion into the planet gear carrier 1 and interrupt-free pushing of the planet gear pin 6. Simultaneously, such a construction enables the formation of two gap seals, which are not shown in more detail and with which a throttled lubricant outflow from the radial rolling bearings 11, 12 of the planet gears 7 is possible, between the middle horizontal legs 31, 32 of the axial bent-up discs 17, 18 and the planet gear holes 8.

LIST OF REFERENCE NUMBERS

1 Planet gear carrier
2 Side wall of 1
3 Side wall of 1
4 Axial hole in 2
5 Axial hole in 3
6 Planet gear pin
7 Planet gear
8 Planet gear hole
9 Axial lubricant feed line in 6
10 Radial lubricant feed line in 6
11 Radial rolling bearing in 8
12 Radial rolling bearing in 8
13 Axial side of 7
14 Axial side of 7
15 Contact element
16 Contact element
17 Axial bent-up disc of 25
18 Axial bent-up disc of 26
19 Bearing needles of 23
20 Bearing needles of 24
21 Axial needle cage of 23
22 Axial needle cage of 24
23 Axial needle ring of 25
24 Axial needle ring of 26
25 Axial needle bearing
26 Axial needle bearing
27 Outer horizontal leg of 17
28 Outer horizontal leg of 18
29 Upper vertical leg of 17
30 Upper vertical leg of 18
31 Middle horizontal leg of 17
32 Middle horizontal leg of 18
33 Lower vertical leg of 17
34 Lower vertical leg of 18
35 Inner horizontal leg of 17

36 Inner horizontal leg of 17
37 Inner side of 29
38 Inner side of 30
39 Outer side of 29
40 Outer side of 30
41 Inner side of 33
42 Inner side of 34
43 Cage of 47
44 Cage of 48
45 Bearing needles of 47
46 Bearing needles of 48
47 Radial needle ring of 11
48 Radial needle ring of 12
49 Gap seal for 25
50 Gap seal for 26
51 Ring gap for 25
52 Ring gap for 26
$B_A$ Axial width of 25 or 26
$D_A$ Outer diameter of 31 or 32
$D_P$ Diameter of 8

The invention claimed is:

1. A planet gear bearing assembly in a planetary gearset, the planetary gearset comprising a planet gear carrier with two side walls that are arranged parallel to each other and hold a plurality of planet gear pins in several coaxial opposing axial holes, planet gears supported on the planet gear pins such that the planet gears are rotatable, radial rolling bearings inserted in central planet gear holes and permanently lubricated via axial and radial lubricant feed lines within the planet wheel pins, wherein, between the side walls of the planet gear carrier and axial sides of the planet gears, ring disc-shaped contact elements are arranged that are formed as wear protection of the planet gear carrier and the planet gears and as an axial contact for the radial rolling bearings of the planet gears, the contact elements between the side walls of the planet gear carrier and the axial sides of the planet gears are provided as axial needle bearings, each of the axial needle bearings including an axial bent-up disc and an axial needle ring formed by a plurality of bearing needles and an axial needle cage, the axial bent-up discs of the axial needle bearings each have an S-shaped profile cross section that is formed radially from an outer axially extending leg, an outer radially extending leg, a middle axially extending leg, an inner radially extending leg, and an inner axially extending leg.

2. The planet gear bearing assembly according to claim 1, wherein each of the axial needle bearings has an axial width ($B_A$) of at least 0.8 mm formed from a diameter of the bearing needles and a material thickness of the axial bent-up disc.

3. The planet gear bearing assembly according to claim 1, wherein the outer axially extending leg, the outer radially extending leg, and the middle axially extending leg of each of the axial bent-up discs are provided for holding the respective axial needle ring, and a first side of each of the outer radially extending legs forms a raceway for the respective plurality of bearing needles.

4. The planet gear bearing assembly according to claim 3, wherein a second side of the outer radially extending leg of each of the axial bent-up discs contacts a respective one of the side walls of the planet gear carrier and a first side of the inner radially extending leg of each of the axial bent-up discs is formed as the axial contact for a respective one of the radial rolling bearings of the planet gears.

5. The planet gear bearing assembly according to claim 4, wherein the radial rolling bearings for each of the planet gears are formed as radial needle rings, each of the radial needle rings including a cage and a plurality of bearing needles that are in contact with a respective one of the inner radially extending legs of the axial bent-up discs.

6. The planet gear bearing assembly according to claim 5, wherein an outer diameter (DA) of each of the middle axially extending legs of the axial bent-up discs is greater than a diameter (Dp) of the planet gear holes, so that, between each of the inner radially extending legs of the axial bent-up discs and a respective one of the axial sides of the planet gears, a gap seal is formed for a throttled lubricant outflow from the radial rolling bearings of the planet gears.

7. The planet gear bearing assembly according to claim 5, wherein an outer diameter (DA) of each of the middle axially extending legs of the axial bent-up discs is smaller than a diameter (Dp) of the planet gear holes, so that, between each of the middle axially extending legs of the axial bent-up discs and a respective one of the planet gear holes, a ring gap is formed for a large volume lubricant outflow from the radial rolling bearings of the planet gears.

8. The planet gear bearing assembly according to claim 5, wherein an outer diameter (DA) of each of the middle axially extending legs of the axial bent-up discs is less than a diameter (Dp) of the planet gear holes, and the middle axially extending legs and the inner axially extending legs are extended axially, so that the middle axially extending leg, the inner axially extending leg, and the inner radially extending leg of each of the axial bent-up discs project into a respective one of the planet gear holes, and (a) the planet gears, (b) the axial needle bearings, and (c) the radial rolling bearings form a module that is installable in the planet gear carrier.

* * * * *